C. H. WISE.
STOP COCK.
APPLICATION FILED JAN. 8, 1921.
1,418,118.
Patented May 30, 1922.
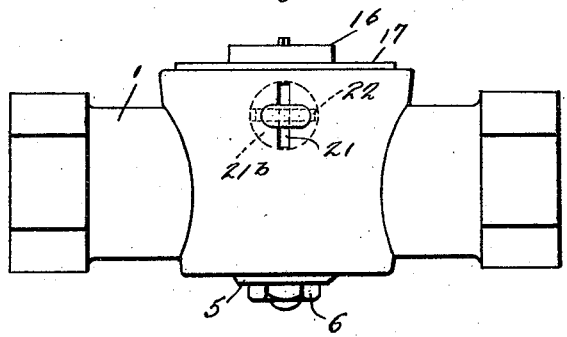
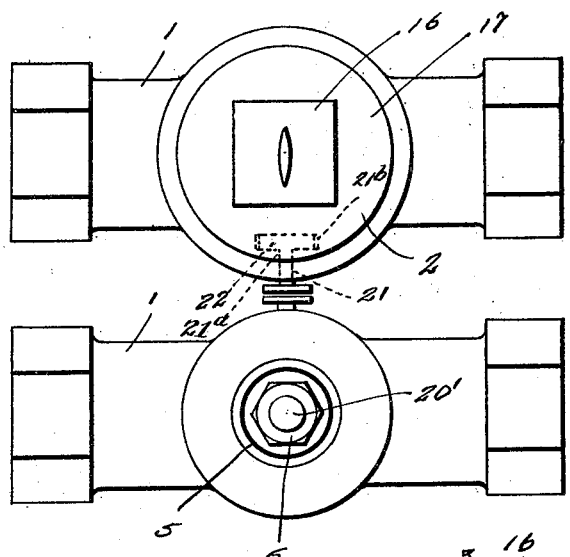
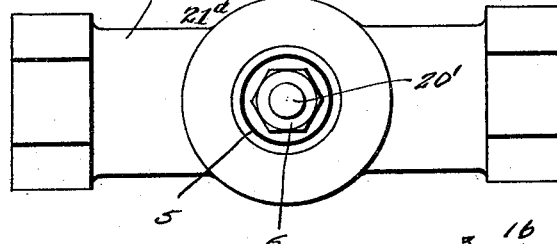
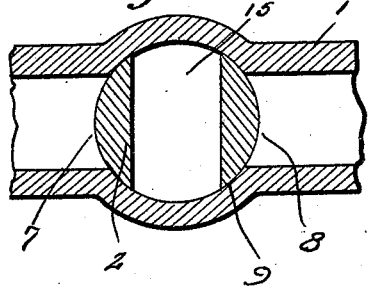
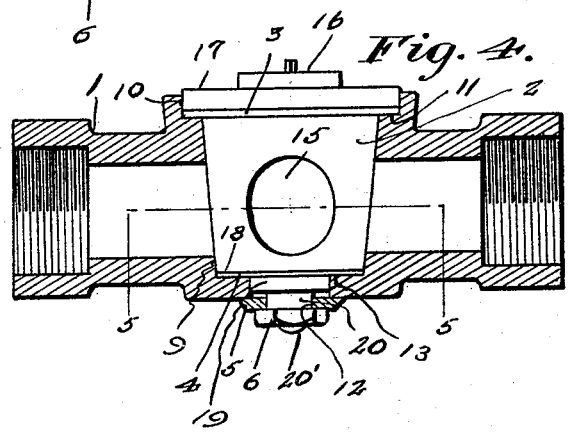
C. H. Wise INVENTOR
BY *Victor J. Evans*
ATTORNEY
WITNESSES

UNITED STATES PATENT OFFICE.

CHARLES H. WISE, OF OIL CITY, PENNSYLVANIA.

STOP COCK.

1,418,118.    Specification of Letters Patent.    Patented May 30, 1922.

Application filed January 8, 1921. Serial No. 435,885.

*To all whom it may concern:*

Be it known that I, CHARLES H. WISE, a citizen of the United States, residing at Oil City, in the county of Venango and State of Pennsylvania, have invented new and useful Improvements in Stop Cocks, of which the following is a specification.

The object of my present invention is the provision of a simple, inexpensive and easily manipulated stop cock constructed with a view to preventing leakage at the ends of the plug of the cock.

To the attainment of the foregoing, the invention consists in the improvement as hereinafter described and definitely claimed.

In the accompanying drawings, forming part hereof:—

Figure 1 is a side elevation of the stop cock constituting the best practical embodiment of my invention of which I am aware.

Figure 2 is a plan view of the same.

Figure 3 is an inverted plan view of the cock.

Figure 4 is a vertical central section of the cock.

Figure 5 is a horizontal section taken in the plane indicated by the line 5—5 of Figure 4.

Similar numerals of reference designate corresponding parts in all of the views of the drawings.

My novel stop cock comprises a casing body 1, a plug 2, washers 3 and 4, and means to detachably secure the plug in the casing body, the said means preferably including a metallic washer 5, and a nut 6.

At opposite points the casing body 1 is provided with ports 7 and 8, one being an induction port and the other an eduction port. The said ports 7 and 8 communicate at their inner ends with a taper bore 9, and the said bore 9 is enlarged at its upper end as indicated by 10 to afford an abutment 11, and is reduced in diameter at its lower end as indicated by 12 to provide an interior abutment 13. The washer 3 which may be of lead or copper for the sake of durability is arranged in the upper enlargement 10 of the taper bore and against the abutment 11. The plug 2 is tapered correspondingly to the taper bore 9 and is provided with a diametrical aperture 15 adapted to be moved into and out of coincidence with the ports 7 and 8. The upper end of the plug 2 is angular as indicated by 16 to facilitate turning of the plug and immediately adjacent to the angular portion 16 the plug is provided with a circumferential flange 17, designed to occupy the enlargement 10 and bear against the washer 3. The plug 2 is reduced to form a shoulder 18 and a spindle 19, and on the shoulder 18 and about the said spindle 19 is arranged the lower washer 4. The spindle 19 is reduced at 20 to seat the metallic washer 5 which is preferably keyed to the spindle, and the spindle is provided at its extreme lower end with a further reduced and threaded portion 20 for the engagement of the nut 6. It follows from this that the plug is adapted to be expeditiously and easily secured in the casing body 1 and is capable of being readily removed from said casing body to give place to a fresh plug when occasion demands.

In the preferred embodiment of my invention I prefer to cut a slot 21 through the casing body and a coincident slot 21$^a$ in the plug, and to employ a dart or key such as indicated by 22 for the purpose of locking the plug to the casing, it being understood in this connection that the slot 21$^a$ in the plug is merged at its inner end into a circular chamber 21$^b$ in the plug, and that the dart or key is provided at the inner end of its shank with a T-head, adapted to be inserted through the coincident slots 21 and 21$^a$ and turned in the chamber 21$^b$ to a position at right angles to the slots 21 and 21$^a$.

My novel stop cock is particularly for use in the handling of oil, and it is materially advantageous because of the employment of the two packing seats, one adjacent to the small end of the plug. It is essential that the taper plug fit snugly in the taper bore of the casing body particularly at the point adjacent to the ports 7 and 8, and it is also essential that the plug should bind more against the packing than against the casing body so that when the nut is tightened it has the effect of preventing leakage at the ends of the plug and at the same time seats the plug more securely in the taper bore at the point where the oil or other fluid is to pass through the stop cock. It will also be appreciated in this connection that the strain is distributed between the two packings and the taper portion of the plug and bore in the casing body so that leakage may be overcome by slight movement of the nut.

Manifestly a stop cock such as described is not only less expensive than a gate valve but is also advantageous because of the facility with which it may be opened and closed.

Having described my invention, what I claim and desire to secure by Letters-Patent, is:—

1. The herein described stop cock comprising a casing body having diametrically opposite ports and a taper bore extending at right angles to and between the ports and having an enlargement at one end and a reduced portion at its opposite ends, forming interior abutments, packing washers arranged in the bore and against said abutments, a taper plug arranged in the taper bore of the casing body and having a diametrical aperture in the same plane as said ports and also having a flange adjacent to one end and an angular portion at said end and further having a spindle, and reduced portions thereon, one of the reduced portions being threaded, a metallic nut keyed on one reduced portion of the spindle and bearing against the casing body, and a nut mounted on the threaded portion of the spindle.

2. The combination in a stop cock, of a casing body having opposite ports and a taper bore between said ports and also having interior abutments adjacent to the ends of said bore, packing washers arranged in the bore and opposed to said abutments, a taper plug snugly fitting in the bore and having abutments opposed to the packing washers and also having a diametrical aperture in the same plane as said ports, and means detachably securing the plug in the bore of the casing body.

3. The combination in a stop cock, of a casing body having opposite ports and a taper bore between said ports and also having interior abutments adjacent to the ends of said bore, packing washers arranged in the bore and opposed to said abutments, a taper plug snugly fitting in the bore and having abutments opposed to the packing washers and also having a diametrical aperture in the same plane as said ports, and means detachably securing the plug in the bore of the casing body; the said casing body and the plug being also provided with slots adapted to receive a dart to hold the plug against turning.

CHARLES H. WISE.

Witnesses:
R. J. BEIGEL,
JOHN M. MOHR.